United States Patent
Challener et al.

(10) Patent No.: US 8,525,776 B2
(45) Date of Patent: Sep. 3, 2013

(54) TECHNIQUES FOR CONTROLLING OPERATION OF A DEVICE WITH A VIRTUAL TOUCHSCREEN

(75) Inventors: David C. Challener, Raleigh, NC (US); James S. Rutledge, Durham, NC (US); Jinping Yang, Beijing (CN)

(73) Assignee: Lenovo (Singapore) PTE. Ltd, Singapore (SG)

( * ) Notice: Subject to any disclaimer, the term of this patent is extended or adjusted under 35 U.S.C. 154(b) by 586 days.

(21) Appl. No.: 12/259,086

(22) Filed: Oct. 27, 2008

(65) Prior Publication Data

US 2010/0103141 A1  Apr. 29, 2010

(51) Int. Cl.
*G06F 3/00* (2006.01)
*G06F 3/023* (2006.01)
*G06F 3/033* (2013.01)

(52) U.S. Cl.
USPC ............ 345/156; 345/168; 345/173; 345/179

(58) Field of Classification Search
USPC .................. 345/156, 1.1, 173, 176, 177, 178, 345/179, 586; 340/932.2, 539.12; 178/18.01, 178/18.02, 18.03, 18.09, 18.11, 19.01, 19.05, 178/20.01
See application file for complete search history.

(56) References Cited

U.S. PATENT DOCUMENTS

| | | | |
|---|---|---|---|
| 6,005,582 A * | 12/1999 | Gabriel et al. | 345/586 |
| 6,008,798 A | 12/1999 | Mato et al. | |
| 6,078,846 A | 6/2000 | Greer et al. | |
| 6,100,538 A | 8/2000 | Ogawa | |
| 6,153,836 A | 11/2000 | Goszyk | |
| 6,281,878 B1 | 8/2001 | Montellese | |
| 6,359,612 B1 * | 3/2002 | Peter et al. | 345/156 |
| 6,531,999 B1 | 3/2003 | Trajkovic | |
| 6,563,491 B1 | 5/2003 | Omura | |
| 6,577,299 B1 * | 6/2003 | Schiller et al. | 345/179 |
| 6,650,318 B1 | 11/2003 | Arnon | |
| 7,164,117 B2 * | 1/2007 | Breed et al. | 250/221 |
| 7,212,109 B2 * | 5/2007 | Morita et al. | 340/539.12 |
| 7,268,774 B2 * | 9/2007 | Pittel et al. | 345/179 |
| 7,710,391 B2 | 5/2010 | Bell et al. | |
| 7,755,026 B2 * | 7/2010 | Pittel et al. | 250/227.13 |
| 7,815,507 B2 * | 10/2010 | Parrott et al. | 463/36 |
| 7,948,448 B2 * | 5/2011 | Hutchinson et al. | 345/1.1 |
| 2001/0019325 A1 | 9/2001 | Takekawa | |
| 2002/0021287 A1 | 2/2002 | Tomasi et al. | |
| 2002/0075240 A1 * | 6/2002 | Lieberman et al. | 345/170 |
| 2003/0233197 A1 | 12/2003 | Padilla et al. | |
| 2004/0061687 A1 | 4/2004 | Kent et al. | |
| 2004/0104894 A1 | 6/2004 | Tsukada et al. | |
| 2006/0101349 A1 | 5/2006 | Lieberman et al. | |
| 2006/0139182 A1 * | 6/2006 | Staniszewski | 340/932.2 |

(Continued)

OTHER PUBLICATIONS

Bolotin, D.—Office Action dated Dec. 14, 2011; U.S. Appl. No. 12/251,939.

*Primary Examiner* — Quan-Zhen Wang
*Assistant Examiner* — Michael J Eurice
(74) *Attorney, Agent, or Firm* — Antony P. Ng; Yudell Isidore Ng Russell PLLC

(57) ABSTRACT

A technique for controlling operation of a device with a virtual touchscreen includes defining an area of a surface, associated with the device, as the virtual touchscreen. An operation within the device is then initiated based on activity within the virtual touchscreen. An overlay may be provided, on a display screen of the device, to indicate a location of the virtual touchscreen with respect to, for example, a keyboard of the device.

2 Claims, 4 Drawing Sheets

(56) References Cited

U.S. PATENT DOCUMENTS

| | | |
|---|---|---|
| 2006/0139314 A1 | 6/2006 | Bell et al. |
| 2006/0202969 A1 | 9/2006 | Hauck |
| 2007/0106950 A1* | 5/2007 | Hutchinson et al. .......... 715/761 |
| 2007/0222760 A1* | 9/2007 | Lieberman et al. .......... 345/168 |
| 2008/0008037 A1 | 1/2008 | Welker |
| 2008/0018591 A1* | 1/2008 | Pittel et al. .................... 345/156 |
| 2008/0036743 A1* | 2/2008 | Westerman et al. .......... 345/173 |
| 2009/0002344 A1 | 1/2009 | Wilson et al. |
| 2009/0109194 A1 | 4/2009 | Weng et al. |
| 2009/0213093 A1 | 8/2009 | Bridger |
| 2010/0090983 A1 | 4/2010 | Challener et al. |

\* cited by examiner

TECHNIQUES FOR CONTROLLING OPERATION OF A DEVICE WITH A VIRTUAL TOUCHSCREEN

CROSS-REFERENCE TO RELATED APPLICATIONS

The present application is related to U.S. patent application Ser. No. 12/251,939 by David C. Challener et al., entitled "TECHNIQUES FOR CREATING A VIRTUAL TOUCHSCREEN," which is commonly assigned with the present application, was filed on Oct. 15, 2008, and is incorporated herein by reference in its entirety for all purposes.

BACKGROUND

1. Field

This disclosure relates generally to a touchscreen and, more specifically to techniques for controlling operation of a device with a virtual touchscreen.

2. Related Art

Traditionally, a touchscreen has been a display that is configured to detect a presence and location of a touch (or near touch) input to an area of the touchscreen. Many touchscreens are configured to sense contact by an instrument, such as a stylus or a finger. Other touchscreens are configured to sense both passive objects (e.g., a finger, a pencil eraser, or a passive stylus) and active objects (e.g., an active stylus such as a digitizer pen) that may not physically contact the touchscreen. Touchscreens may be configured to concurrently sense a single point of contact or multiple points of contact. In general, touchscreens facilitate user interaction with what is displayed directly on the touchscreen, as contrasted with indirect interaction through, for example, a mouse or a touchpad.

Touchscreens are frequently incorporated within devices such as personal digital assistants (PDAs), satellite navigation equipment, point-of-sale systems, kiosk systems, automatic teller machines (ATMs), portable gaming consoles, mobile phones, smart phones, etc. A wide variety of different technologies may be employed in touchscreens. For example, traditional touchscreens may implement resistive, surface acoustic wave (SAW), capacitive, infrared, strain gauge, optical imaging, or dispersive signal technologies, among other technologies, depending on an application. A tablet personal computer (PC) is an example of a mobile computer system that may employ a touchscreen to facilitate user input (via a stylus, digital pen, fingertip, or other instrument) to operate the tablet PC.

A wide variety of systems (e.g., notebook computer systems (notebooks), personal digital assistants (PDAs), laptop computer systems (laptops), and portable media players) have implemented touchpads. A touchpad is a pointing device that can translate motion and position of a finger of a user to a relative position on a display screen. When implemented in a notebook, touchpads have usually been incorporated on a surface of the notebook, adjacent a keypad. Touchpads (and associated buttons) are frequently provided as a substitute for a mouse. Touchpads vary in size but are normally smaller than three square inches. Touchpads are relative motion devices, similar to a mouse, with a cursor on a display screen moving in a same direction as a finger moving across a surface of the touchpad. In a typical touchpad implementation, buttons adjacent (e.g., below or above) the touchpad serve as standard mouse buttons.

Depending on the touchpad and associated driver, a tap of a finger on the touchpad may correspond to a mouse click. Touchpad drivers may enable the use of multiple fingers to facilitate other mouse buttons (e.g., two-finger tapping for a center mouse button). Some touchpads also implement hotspots (i.e., locations on the touchpad that indicate user intentions other than pointing). For example, on certain touchpads, moving a finger along an edge of the touchpad initiates a scroll wheel for scrolling an in-focus window vertically or horizontally, depending on which edge of the touchpad is stroked. Certain touchpad drivers also allow for tap zones (i.e., regions in which a tap executes a function). In this case, tapping in a tap zone may, for example, pause a media player or launch an application.

SUMMARY

A technique for controlling operation of a device with a virtual touchscreen includes defining an area of a surface associated with the device as the virtual touchscreen. An operation within the device is then initiated based on activity within the virtual touchscreen. An overlay may be provided, on a display screen of the device, to indicate a location of the virtual touchscreen with respect to, for example, a keyboard of the device.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
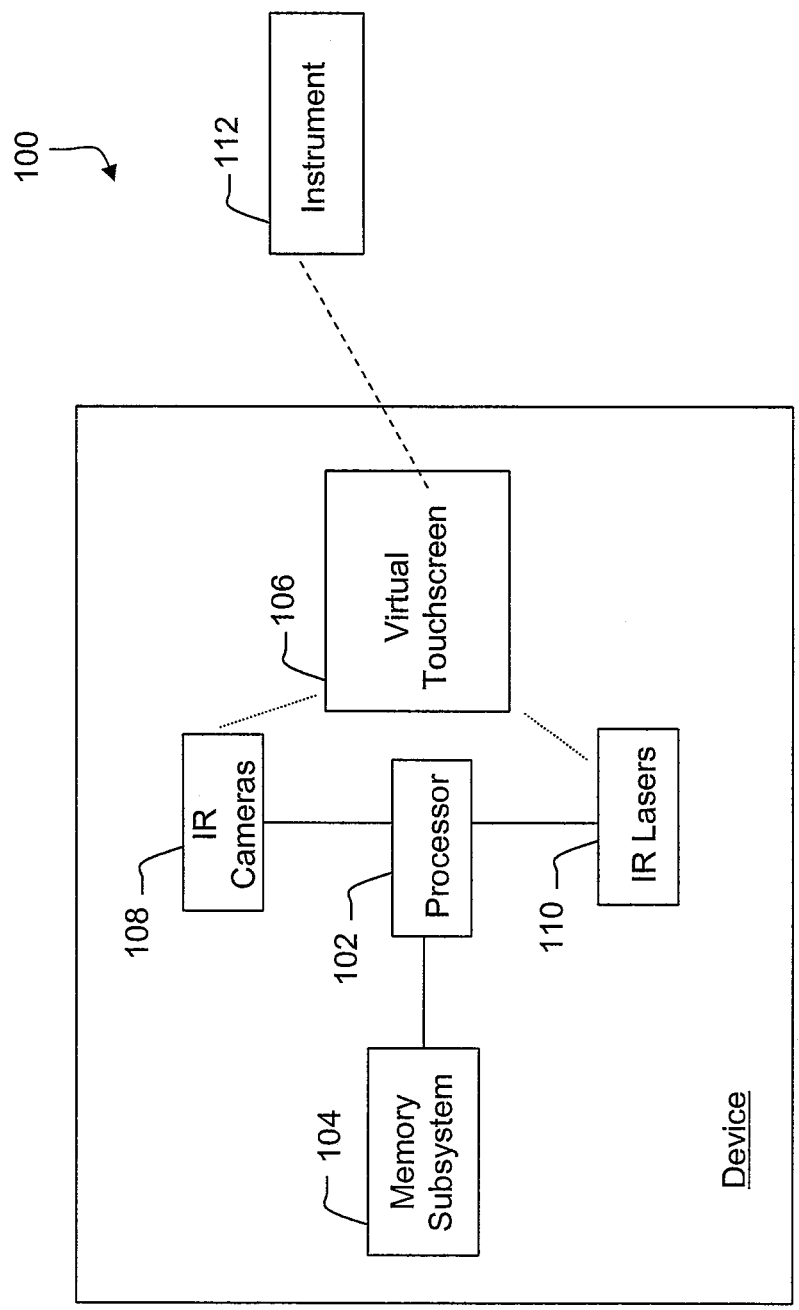
FIG. 1 is a block diagram of a relevant portion of an example device that is configured to create a virtual touchscreen, according to one or more embodiments of the present disclosure.

As will be appreciated by one of ordinary skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product on a computer-readable storage medium having computer-readable program code embodied in the medium.

Any suitable computer-usable or computer-readable storage medium may be utilized. The computer-usable or computer-readable storage medium may be, for example, but is not limited to, an electronic, magnetic, optical, electromagnetic, infrared, or semiconductor system, apparatus, or device. More specific examples (a non-exhaustive list) of the computer-readable storage medium includes the following: a portable computer diskette, a hard disk, a random access memory (RAM), a read-only memory (ROM), an erasable programmable read-only memory (EPROM) or flash memory, a portable compact disc read-only memory (CD-ROM), an optical storage device, or a magnetic storage device. It should be noted that the computer-usable or computer-readable storage medium can even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable storage medium may be any medium that can contain or store a program for use by or in connection with an instruction execution system, apparatus, or device.

Computer program code for carrying out operations of the present invention may be written in an object oriented programming language, such as Java, Smalltalk, C++, etc. However, the computer program code for carrying out operations of the present invention may also be written in conventional procedural programming languages, such as the "C" programming language or similar programming languages. The program code may execute entirely on a single processor, on multiple processors that may be remote from each other, or as a stand-alone software package. When multiple processors are employed, one processor may be connected to another processor through a local area network (LAN) or a wide area network (WAN), or the connection may be, for example, through the Internet using an Internet service provider (ISP).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. As used herein, the term "coupled" includes both a direct electrical connection between blocks or components and an indirect electrical connection between blocks or components achieved using one or more intervening blocks or components.

According to various aspects of the present disclosure, techniques are implemented that facilitate the creation of a virtual touchscreen. In order to accurately position a virtual touchscreen on a surface, it is usually desirable to accurately determine various areas on the surface. Advantageously, the disclosed techniques facilitate the implementation of a virtual touchscreen, without incurring many of the costs associated with a conventional touchscreen. The virtual touchscreen may, for example, be advantageously employed to implement gesture control in a wide variety of devices. In general, during a calibration process, a position of an object (e.g., a finger of a user) is determined by capturing, with a first infrared camera, a first reflection from the object at a known position that is adjacent a surface associated with a device (e.g., a notebook). A second reflection from the object (at the known position) is captured with a second infrared camera. The first and second reflections are then correlated with the known position to provide a two-dimensional position for the object that is calibrated with respect to the surface.

In a typical implementation, multiple infrared (IR) lasers (e.g., two IR lasers) are employed to provide a plane of IR light above a surface (e.g., about one-quarter inch in front of a display screen surface or about one-quarter inch above a notebook base surface) that is viewed by multiple IR cameras (e.g., two IR cameras). When an object (e.g., a finger of a user) breaks the IR light plane, reflections from the object are captured by the multiple IR cameras. During the calibration process, an object is utilized to break the IR light plane at one or more known locations. For example, the known locations may correspond to certain keys of a keyboard (e.g., a 'Q' key, a 'Z' key, an 'O' key, and an 'M' key). In this manner, the surface may be calibrated. In general, a calibrated surface facilitates accurately defining areas of the calibrated surface as respective virtual touchscreens that may, for example, be employed for gesture control. Moreover, accurately defining areas of a calibrated surface as virtual touchscreens allows a system to disregard gestures (hand movements) in areas that are undefined.

While the discussion herein is primarily focused on a notebook, it is contemplated that the disclosed techniques may be advantageously applied in a wide variety of devices (e.g., desktop computer systems, laptops, personal digital assistants (PDAs), smart phones, and mobile phones). When implemented in a desktop computer system, a keyboard (which may include multiple IR lasers for establishing an IR light plane) may, for example, be established at a known distance with respect to a monitor (which includes multiple IR cameras that view an area in front of the monitor and over the keyboard). One or more keys may then be actuated by a user during a calibration process. A user may then, for example, define areas of the surface in a particular manner and assign operations to the defined areas for the implementation of gesture control. It should be appreciated that an existing computer system may be readily retrofitted to utilize one or more virtual touchscreens, configured according to the present disclosure, for gesture control.

In at least one embodiment, an assumption is made that two-dimensional coordinates (i.e., 'X' and 'Y' coordinates) of a reflection from a surface (e.g., a top surface of a base of a notebook) are independent of each other and are related to actual two-dimensional coordinates of the surface. In this case, the two-dimensional surface coordinates can be written as a third-order Taylor series expansions as follows:

$$Xs = A3Xr^3 + A2Xr^2 + A1Xr + A0$$

$$Ys = B3Yr^3 + B2Yr^2 + B1Yr + B0$$

where Xs is the actual 'X' surface position, Xr is the 'X' reflected position, Ys is the actual 'Y' surface position, and Yr is the 'Y' reflected position. The coefficients (i.e., A3, A2, A1, A0, B3, B2, B1, and B0) may be, for example, determined by performing a polynomial regression (e.g., using MatLab™). Sensitivity analysis of the height of the IR cameras over a viewed area indicates that the coefficients are normally stable enough to be unaffected by typical manufacturing process variations for notebooks. Assuming a constant acceleration, an 'X' position of an object moving across a virtual touchscreen may be estimated at time 'Tn' as follows:

$$Xn=3Xn-1-3Xn-2+Xn-3$$

where 'Xn' is the position of the object at time 'Tn'. A moving average may be employed to eliminate jiggle in the 'X' position that is attributable to reflection intensity variations. Assuming that a third derivative of 'Xn' is constant, 'Xn' may be estimated as follows:

$$Xn=(25/6)Xn-1-(13/2)Xn-2+(7/6)Xn-3$$

The 'Y' position may be estimated in a similar manner as the 'X' position. In certain situations, e.g., when multiple fingers of a user are employed for gesture control, it may be difficult to properly determine where multiple objects are positioned within a virtual touchscreen, based solely on reflection angles. In this case, reflection intensity may also be utilized to accurately determine a position of multiple objects, e.g., multiple fingers of the user. In a typical situation, employing reflection intensity amplitudes (to distinguish between multiple possible object positions) generally facilitates accurate position identification of multiple objects (where a higher reflection intensity amplitude is associated with actual position of the multiple objects).

With reference to FIG. 1, an example device 100 is illustrated that includes a virtual touchscreen 106 that is configured to receive input from a user via instrument 112. While only one virtual touchscreen 106 is depicted, it should be appreciated that multiple of the virtual touchscreens 106 may be implemented in the device 100. According to one aspect of the present disclosure, the virtual touchscreen 106 is facilitated through implementation of IR lasers 110 (which create an IR light plane above a surface that includes the virtual touchscreen 106) and IR cameras 108 (which are positioned to view the surface to detect reflections when an object enters the IR light plane). The instrument 112 may correspond to, for example, a stylus, an eraser of a pencil, or one or more fingers of a user.

As is shown in FIG. 1, the IR cameras 108 and the IR lasers 110 are coupled to a processor 102 (that includes one or more central processing units (CPUs)), which is coupled to a memory subsystem 104 (which includes an application appropriate amount of volatile and non-volatile memory). The device 100 may also include, for example, a video card, a hard disk drive (HDD), a network interface card (NIC), a compact disk read-only memory (CD-ROM) drive, among other components not shown in FIG. 1. The device 100 may be, for example, a notebook, a laptop, a tablet PC, a PDA, a smart phone, a mobile phone, or virtually any other device that may benefit from implementation of one or more virtual touchscreens.

Figure 2:
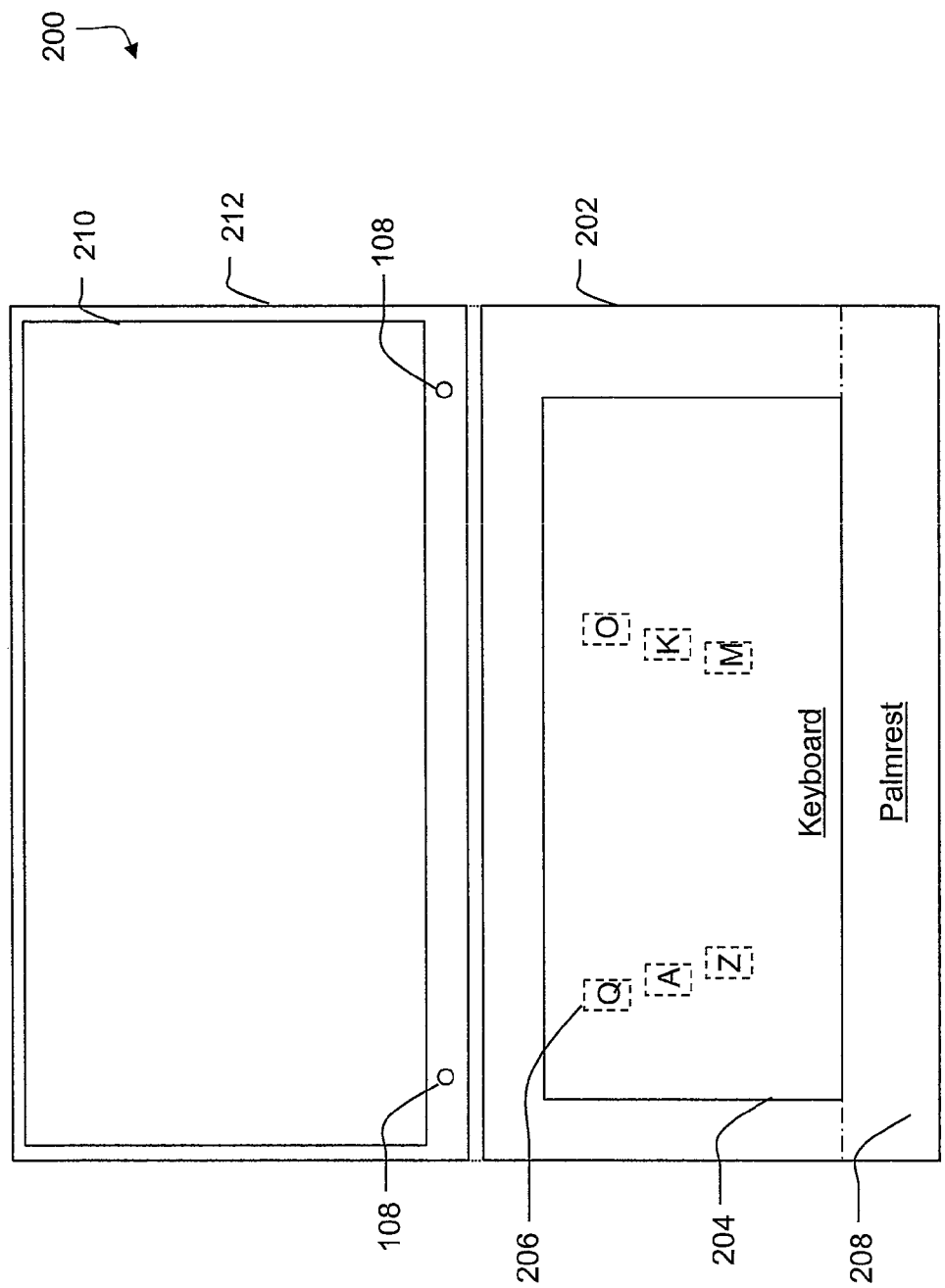
FIG. 2 is a diagram of a relevant portion of the example device of FIG. 1, when the device takes the form of a notebook computer system (notebook).

With reference to FIG. 2, an example notebook 200 is illustrated that is configured according to one embodiment of the present disclosure. As is illustrated in FIG. 2, the notebook 200 includes a lid 212 that houses multiple IR cameras 108 (e.g., at opposite sides of the lid 212 below a display screen 210) and the display screen 210 (e.g., a liquid crystal display (LCD) screen). The notebook 200 also includes a base 202 that includes a keyboard 204 (having multiple keys 206 (only some of which are shown)) and a palmrest 208. The IR cameras 108 are positioned to view a top surface of the base 202.

As the keys 206 are located in known positions for a given notebook model, one or more of the keys 206 may be actuated by a user (during a calibration process) to calibrate the surface of the base. One or more virtual touchscreens can then be established in desired areas of the calibrated surface of the base 202. For example, one or more virtual touchscreens may be defined over the palmrest 208, over the keyboard 204, and/or at another location.

Figure 3:
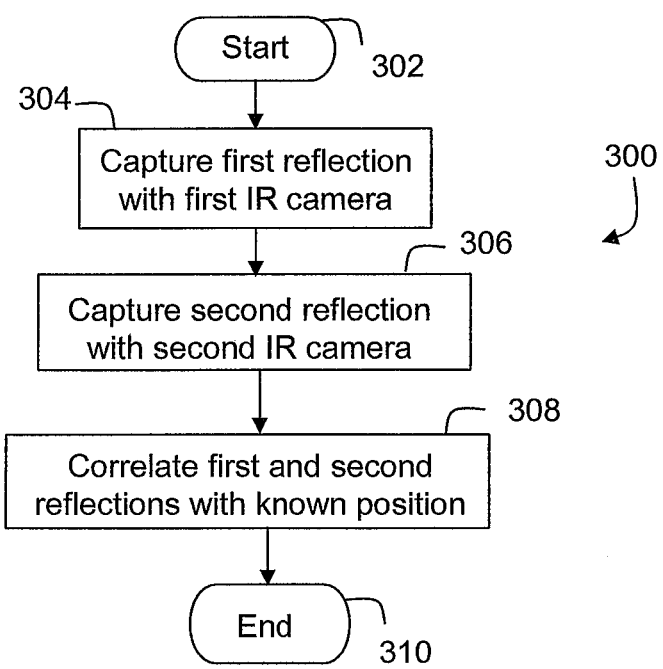
FIG. 3 is a flowchart of an example process for creating a virtual touchscreen, according to one or more embodiments of the present disclosure.

Moving to FIG. 3, an example process 300 for creating a virtual touchscreen is illustrated. For clarity, the process 300 is discussed in conjunction with the device 100 of FIG. 1. In block 302, the process 300 is initiated at which point control transfers to block 304, where the processor 102 controls a first IR camera (included in the IR cameras 108) to capture a first reflection from an object that is at a known position adjacent a surface associated with the device 100. Next, in block 306, the processor 102 controls a second IR camera (included in the IR cameras 108) to capture a second reflection from an object that is at a known position adjacent the surface associated with the device 100.

In a typical embodiment, the processor 102 may carry out the functions of blocks 304 and 306 in parallel, as the first and second reflections are a result of the object breaking an IR plane provided by the IR lasers 110. Then, in block 308, the processor 102 executes a routine that correlates the first and second reflections with the known position. The known position may, for example, correspond to a key of a keyboard. To improve accuracy, the process 300 may be executed for multiple keys. For example, a user may be directed to actuate the 'Q' key, followed by the 'A' key, followed by the 'Z' key, followed by the 'O' key, followed by the 'K' key, followed by the 'M' key. Following block 308, control transfers to block 310 where the process 300 terminates and returns to a calling routine.

Figure 4:
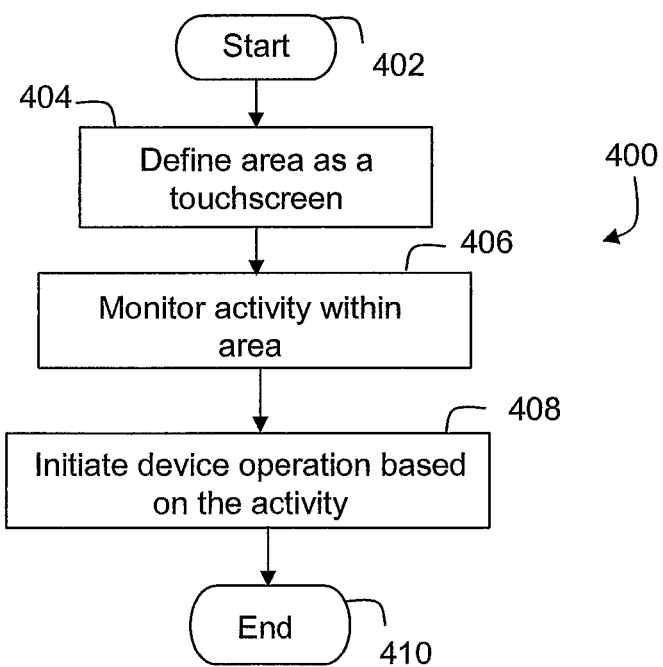
FIG. 4 is a flowchart of an example process for defining one or more virtual touchscreens, according to one or more embodiments of the present disclosure.

With reference to FIG. 4, an example process 400 for defining a virtual touchscreen for a device, according to one aspect of the present disclosure, is illustrated. To facilitate better understanding, the process 400 is explained in conjunction with the device 100 of FIG. 1. The process 400 is initiated in block 402, at which point control transfers to block 404. In block 404, an area adjacent a surface (associated with the device 100) is defined as a virtual touchscreen. For example, the process 400 may include the user selecting four corners of a rectangle to define a rectangular virtual touchscreen. As another example, a user may select a first point that corresponds to a center of a circle and a second point that corresponds to a radius of the circle to define a circular virtual touchscreen. Next, in block 406, after defining the virtual touchscreen, an associated area is monitored (by the IR cameras 108 and the processor 102) for activity.

The activity may, for example, correspond to a particular hand movement by a user over the monitored area. For example, a user may bring to two fingers together in a virtual touchscreen to shrink an active window. As another example, a user may move two fingers apart in a virtual touchscreen to expand an active window. Then, in block 408, an operation is initiated by the device 100 when an activity is detected. The operation may, for example, correspond to shrinking or expanding an active window or paging (up or down) a document in an active window. To aid utilization of the virtual touchscreen, an overlay may be provided, on a display screen of a device, to indicate a location of the virtual touchscreen with respect to, for example, a keyboard of the device. Following block 408, control transfers to block 410 where the process 400 terminates and returns to a calling routine. Accordingly, techniques have been disclosed herein that advantageously provide for the creation of virtual touchscreens for a device, while containing a cost for the device. The virtual touchscreens may, for example, be utilized to implement gesture control within various devices that have a relatively low cost.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. For example, the present techniques can be implemented in any kind of system that includes a hard disk drive. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A data processing device comprising:
    two infrared lasers for providing a plane of infrared light above a surface of said data processing device to transform said surface into a virtual touchscreen;
    two infrared cameras positioned to capture infrared light reflected from an object breaking said plane of infrared light; and
    a processor, coupled to said two infrared cameras, for determining a position of said object within said virtual touchscreen based on information related to said captured infrared light reflected from said object by solving $Xs = A3Xr^3 + A2Xr^2 + A1Xr + A0$ $Ys = B3Yr^3 + B2Yr^2 + B1Yr + B0$ wherein Xs is an actual X surface position, Xr is a reflected X position as detected by a first one of said infrared cameras, Ys is an actual Y surface position, Yr is a reflected Y position as detected by a second one of said infrared cameras, wherein A0, A1, A2, A3, B0, B1, B2, and B3 are coefficients specific to physical dimensions of said virtual touchscreen, wherein said coefficients are determined by performing a polynomial regression.

2. The data processing device of claim 1, wherein said processor determines said position of said object by utilizing reflection intensity of said infrared light reflected from said object.

* * * * *